Aug. 7, 1962　　　C. F. IRVIN　　　3,048,454
BEARING ASSEMBLY FOR DYNAMOELECTRIC MACHINES
Filed April 5, 1960
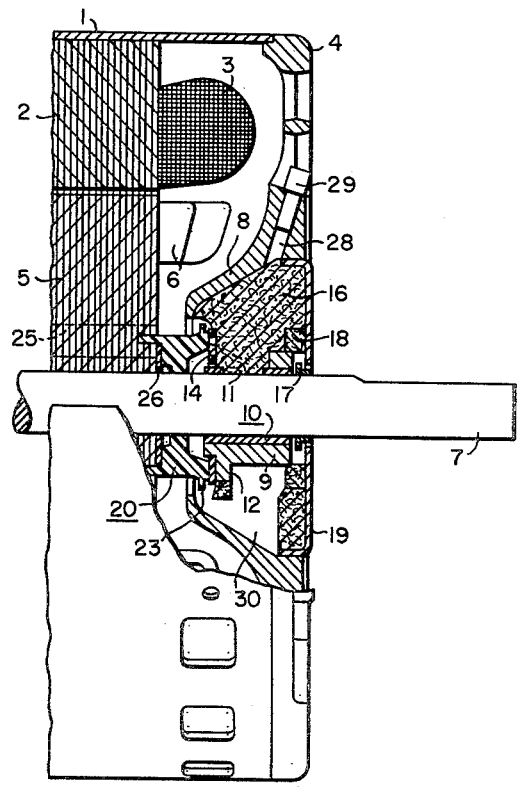
Fig. 1.
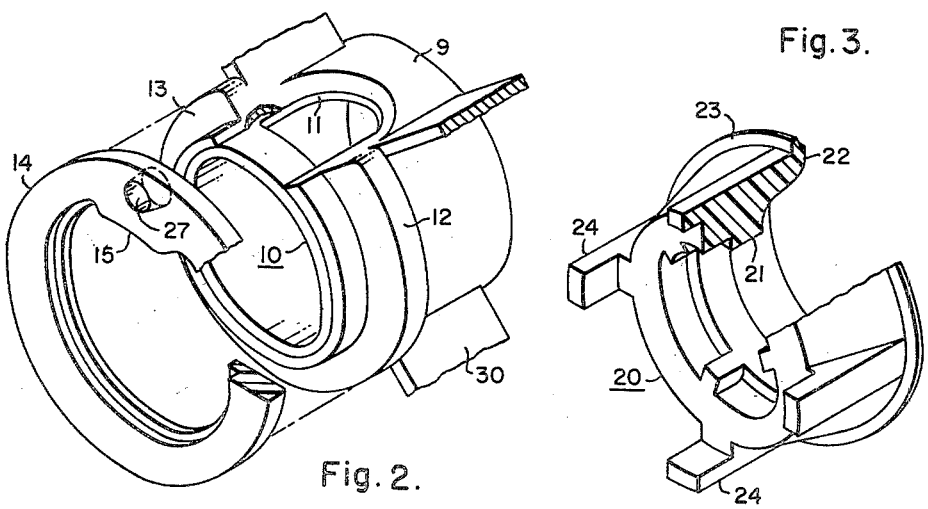
Fig. 2.
Fig. 3.
WITNESSES
Edwin E. Bassler
James F. Young
INVENTOR
Charles F. Irvin
BY  F. P. Lyle
ATTORNEY

United States Patent Office 3,048,454
Patented Aug. 7, 1962

3,048,454
BEARING ASSEMBLY FOR DYNAMOELECTRIC MACHINES
Charles F. Irvin, Lima, Ohio, assignor to Westinghouse Electric Corporation, East Pittsburgh, Pa., a corporation of Pennsylvania
Filed Apr. 5, 1960, Ser. No. 20,111
5 Claims. (Cl. 308—36.4)

The present invention relates to bearing assemblies, and more particularly to a compact sleeve bearing assembly for dynamoelectric machines.

While the bearing assembly of the present invention is not necessarily restricted to any specific use, it is particularly suitable for small dynamoelectric machines such as electric motors of the fractional horsepower sizes. There are increasing requirements for more compact designs of such motors, and it is especially desirable to make the axial length of the motor as short as possible. An important part of the length of the motor consists of the two end brackets, and the axial dimensions of the brackets are largely determined by the construction of the bearings which are supported in them.

Oil lubricated sleeve bearings are usually used in motors of this type, and the bearing assembly must include means for taking axial thrust and usually also means for adjusting or limiting end play of the shaft. In conventional designs, the thrust means and end play washers are separate elements which add to the length of the bearing assembly, and oil flingers at the ends of the bearing are usually also required. These elements all add to the length of the bearing assembly in conventional designs and make it difficult to materially reduce the axial length of the end bracket. The conventional designs also have other disadvantages since the thrust surfaces are usually located immediately adjacent the shaft and frequently cannot be made of sufficient area. It is also difficult in these prior designs to adequately lubricate the thrust surfaces and to accurately locate or position them to properly control the end play. Thus the prior designs of bearings for small electric motors have had many disadvantages as well as making the bearing assembly undesirably long.

The principal object of the present invention is to provide a bearing assembly which includes improved means for taking axial thrust and which is of minimum axial length.

Another object of the invention is to provide a bearing assembly for dynamoelectric machines which is of minimum axial length and which includes thrust surfaces which are positively lubricated and of relatively large area.

A further object of the invention is to provide a dynamoelectric machine having an improved sleeve bearing assembly which provides adequately lubricated thrust surfaces and includes a combined thrust member and oil flinger which makes possible a very compact design and which can readily be positioned axially to control end play.

Other objects and advantages of the invention will be apparent from the following detailed description, taken in connection with the accompanying drawing, in which:

FIGURE 1 is a side view, partly in longitudinal section, showing one end of an electric motor with a bearing assembly embodying the invention;

FIG. 2 is an exploded perspective view, on a larger scale, of the stationary parts of the bearing assembly; and FIG. 3 is a perspective view, partly cut away, of a combined thrust and flinger element.

A preferred embodiment of the invention is shown in the drawing as applied to a small electric motor. The motor itself may be of any suitable construction and is shown, for the purpose of illustration, as having a housing or frame 1 in which is supported a laminated stator core 2 carrying windings 3 of any suitable type. Both ends of the housing 1 are closed by end brackets 4. The motor also has a rotor member 5 which may comprise a laminated rotor core carrying a suitable secondary winding shown as a squirrel cage winding 6. The rotor member 5 is mounted on a shaft 7 which extends through the end brackets 4.

The end brackets 4 may be of identical construction at both ends of the motor and only one bracket has been shown in the drawing. The end bracket 4 may be of any suitable construction and includes a central bearing housing portion 8 through which the shaft 7 extends. A bearing support or hub 9 is supported in the hub portion 8 of the end bracket 4 by any suitable means such as integral radial ribs 30. A sleeve bearing 10 is pressed into the bearing support 9. The bearing 10 may be of the usual type having a steel shell with a liner of babbitt or other suitable bearing material and with a window 11 in the upper part of the bearing to permit lubricant to be supplied to the shaft 7. The bearing support 9 has an opening coinciding with the window 11 and extending to the end of the bearing support, as clearly shown in FIG. 2. A circumferential rib or flange 12 extends around the bearing support 9 intermediate its ends to provide a radial shoulder 13. The rib 12 is preferably positioned as shown near the end of the bearing so that it is interrupted by the opening in the bearing support.

A thrust member is carried on the bearing support 9 to provide a radial thrust bearing surface. The thrust member is preferably an annular washer 14 which may be molded of a suitable plastic material such as nylon, although other suitable materials such as steel, sintered iron or bronze, or other molded materials might be used. The washer 14 fits snugly on the end of the bearing support 9 and is supported against the shoulder 13. The washer 14 has an inwardly extending portion or tongue 15 which is adapted to engage in the opening in the bearing support 9 to lock the washer 14 against rotation, so as to provide a stationary radial bearing surface.

Any suitable means may be provided in the bracket for supplying lubricant to the bearing. Preferably, the bearing housing 8 is filled, or partially filled with a lubricant storage and feeding means 16 which may be a mass of oil saturated wicking or which may be a mass of cellulose fiber impregnated with oil. The lubricating means 16 fills the hub portion 8 around the bearing and contacts the shaft 7 through the window 11 to supply oil to the shaft to be carried into the bearing surfaces. An oil flinger 17 of any suitable type is mounted on the shaft 7 adjacent the outer end of the bearing 10 to throw off oil escaping from that end of the bearing. A felt washer 18 may be placed around the flinger 17 to receive oil thrown off by the flinger and return it to the oil storage means 16. The outer end of the bearing housing 8 is closed by a cap 19, and the oil storage and feeding means 16 is confined to the desired space within the bearing housing 8 in any suitable manner.

A combined thrust and flinger member 20 is carried on the shaft 7. The flinger member 20, as clearly shown in FIG. 3 is a circular member which may be molded of a suitable material such as nylon and which has a central opening 21 which fits snugly on the shaft 7. The flinger member 20 is made of sufficient axial length to extend from the bearing support 9 to closely adjacent the rotor member 5. The side of the flinger member 20 which faces the bearing support 9 is formed to have an annular, radial, substantially plane surface 22 which engages the opposing radial surface of the stationary thrust washer 14. A radial flinger portion 23 extends circumferentially around the flinger member 20 at its outer periphery so as to be radially outside of the bearing surface 22. At the opposite end of the flinger member 20 a plurality of axial extensions or tangs 24 are provided. The tangs 24 engage the rotor member 5, preferably being inserted in the usual axial ventilating passages 25. Thus, the flinger member 20 is positively driven by the rotor and rotates with the shaft.

The axial position of the member 20 is accurately adjusted by means of one or more spacer washers 26 placed between the rotor member 5 and the member 20. The washers 26 may be either rigid or resilient and any necessary number of washers may be used to adjust the rotor position or to absorb vibration if necessary. The axial position of the thrust member 20 is thus accurately determined, and the end play in the motor can be accurately adjusted and controlled since the thrust surface 22 of the member 20 engages the bearing surface of the thrust washer 14 which is positively supported by the fixed shoulder 13 on the bearing support 9.

In operation, the thrust member and flinger 20 is driven by the rotor 5 so that it rotates with the shaft and its surface 22 engages the radial bearing surface of the stationary thrust member 14 to take axial thrust. The rotor 5 is accurately positioned, and its end play is controlled, by the spacing washers 26 which determine the axial positions of the thrust members 20 at opposite ends of the motor. Since these members engage the fixed thrust members 14 at the opposite ends, the rotor is accurately positioned. Oil is fed to the bearing 10 in the usual manner through the window 11 from the lubricant feed means 16 and flows to opposite ends of the bearing. At the outer end, the oil is thrown off the shaft by the flinger 17 and is received by the felt washer 18 which returns it to the lubricant means 16. At the inner end, oil escaping from the bearing travels radially between the stationary thrust washer 14 and the rotating thrust member 20 and thus lubricates their engaging surfaces. If desired, additional lubrication may be provided by means of an opening 27 in the upper part of the thrust washer 14 which permits lubricant to flow directly to the thrust bearing surfaces from the lubricant storage means 16 which is in contact with the washer 14 through the interruption in the rib 12. Oil passing between the thrust bearing surfaces reaches the flinger portion 23 of the member 20 and is thrown off and returned to the oil storage means 16. If desired, an oiling passage 28 may be provided in the bracket 4, normally closed by a plug 29, to permit the addition of oil when necessary.

A bearing assembly is thus provided which has many advantages. By locating the thrust surfaces intermediate the ends of the bearing, a substantial saving in length is obtained, making possible a very compact design and a corresponding reduction in the length of the motor itself. The circumferential rib 12 on the bearing support, which provides the necessary thrust surface, also improves substantially the heat dissipation from the bearing surfaces both of the sleeve bearing and of the thrust bearing. In addition, the rib 12 helps to strengthen the end of the bearing support 9 adjacent the opening in which the thrust washer 14 engages. It will be noted that the washer 14 effectively closes the interruption in the rib 12 corresponding to the opening in the end of the bearing support and thus restricts the lubricant means 16 to its proper place as well as permitting the lubricant to feed directly to the thrust bearing surface through the opening 27.

The thrust surfaces are removed from the immediate vicinity of the shaft and may be made of any desired radial extent so as to have adequate area for the thrust load to be imposed on them. Effective lubrication is insured since all of the oil escaping from the end of the bearing must pass between the engaging thrust surfaces and additional lubricant is provided through the opening 27. The required flinger action to return the oil to the lubricant storage means is obtained by the flinger portion 23 of the member 20 which is radially outside of the thrust surfaces so that the flinger requires no additional axial length, since it is almost in the same plane as the thrust surfaces. By thus placing the thrust surfaces and flinger intermediate the ends of the bearing, a very compact construction is obtained and the total length of the bearing assembly is kept to a minimum. The position of the engaging thrust surfaces remote from the shaft, and their proximity to the rig 12, provide for excellent heat dissipation and prevent the risk of overheating which was difficult to avoid in prior constructions where the thrust surfaces were close to the shaft and usually of inadequate area. As previously indicated, the thrust member and flinger 20 is positively driven from the rotor and can readily be located axially by spacer washers 26 which do not materially add to the overall length of the assembly but which make possible a much better adjustment and control of end play than has heretofore been obtained.

It will now be apparent than an improved bearing assembly has been provided which is especially suitable for small electric motors. The new bearing assembly makes possible a much more compact design by placing the thrust surfaces intermediate the ends of the sleeve bearing and provides a greatly improved thrust bearing having better lubrication and larger bearing area than has previously been obtainable. A preferred embodiment of the invention has been shown and described for the purpose of illustration, but it will be understood that various modifications and other embodiments of the invention are possible, and it is not limited to the specific details of construction shown but includes all equivalent embodiments and modifications.

I claim as my invention:

1. A bearing assembly for a rotatable shaft comprising a sleeve bearing member for supporting the shaft, support means for said bearing member including a radial shoulder extending circumferentially at least part way around the bearing member intermediate the ends thereof, a stationary annular thrust member supported against said shoulder and having a radial bearing surface, means for supplying lubricant to the bearing member, and a flinger member rotatable with the shaft adjacent the end of the bearing member, said flinger member having a radial surface thereon engaging the radial bearing surface of said thrust member.

2. A bearing assembly for a rotatable shaft comprising a sleeve bearing member for supporting the shaft, support means for said bearing member including a radial shoulder extending circumferentially at least part way around the bearing member intermediate the ends thereof, an annular thrust member supported against said shoulder and having a radial bearing surface, said thrust member having a portion engaging in an opening in said support means to restrain the thrust member against rotation, means for supplying lubricant to the bearing member, and a flinger member rotatable with the shaft adjacent the end of the bearing member, said flinger member having a radial surface thereon engaging the radial bearing surface of said thrust member.

3. A bearing assembly for a rotatable shaft comprising a sleeve bearing member for supporting the shaft, support means for said bearing member including a radial shoulder extending circumferentially at least part way around the bearing member intermediate the ends thereof, a stationary annular thrust member supported against said shoulder and having a radial bearing surface, means for supplying lubricant to the bearing member, a flinger member rotatable with the shaft adjacent the end of the bearing member, and means for positioning the flinger member axially of the shaft, the flinger member having a radial surface engaging the radial bearing surface of said thrust member and having a flinger portion radially outside of the radial surface.

4. A dynamoelectric machine having a stator member and a rotor member, the stator member including an end bracket having a central bearing housing portion, a shaft for the rotor member extending through said end bracket, a bearing support member in the bearing housing, a sleeve bearing member in said support member for supporting said shaft, said bearing support member having a radial shoulder extending circumferentially at least part way around the bearing support member intermediate the ends thereof, an annular thrust member supported against said shoulder and held against rotation, said thrust member having a radial bearing surface, lubricant storing and feeding means disposed within the bearing housing for supplying lubricant to the bearing member, a flinger member rotatable with the shaft adjacent the end of the bearing member, means for positioning the flinger member axially of the shaft, said flinger member having a radial surface engaging the radial bearing surface on said thrust member and having a flinger portion radially outside said radial surface.

5. A dynamoelectric machine having a stator member and a rotor member, the stator member including an end bracket having a central bearing housing portion, a shaft for the rotor member extending through said end bracket, a bearing support member in the bearing housing, a sleeve bearing member in said support member for supporting said shaft, said bearing support member having a radial shoulder extending circumferentially at least part way around the bearing support member intermediate the ends thereof, an annular thrust member supported against said shoulder and held against rotation, said thrust member having a radial bearing surface, lubricant storing and feeding means disposed within the bearing housing for supplying lubricant to the bearing member, a flinger member on the shaft adjacent the end of the bearing member, spacing means on the shaft between the flinger member and the rotor member for positioning the flinger member axially of the shaft, and means for causing the flinger member to rotate with the shaft, said flinger member having a radial surface engaging the radial bearing surface of said thrust member and having a flinger portion radially outside of said radial surface.

References Cited in the file of this patent
UNITED STATES PATENTS

| | | |
|---|---|---|
| 2,739,020 | Howes | Mar. 20, 1956 |
| 2,892,664 | Howes et al. | June 30, 1959 |